United States Patent Office 3,516,459
Patented June 23, 1970

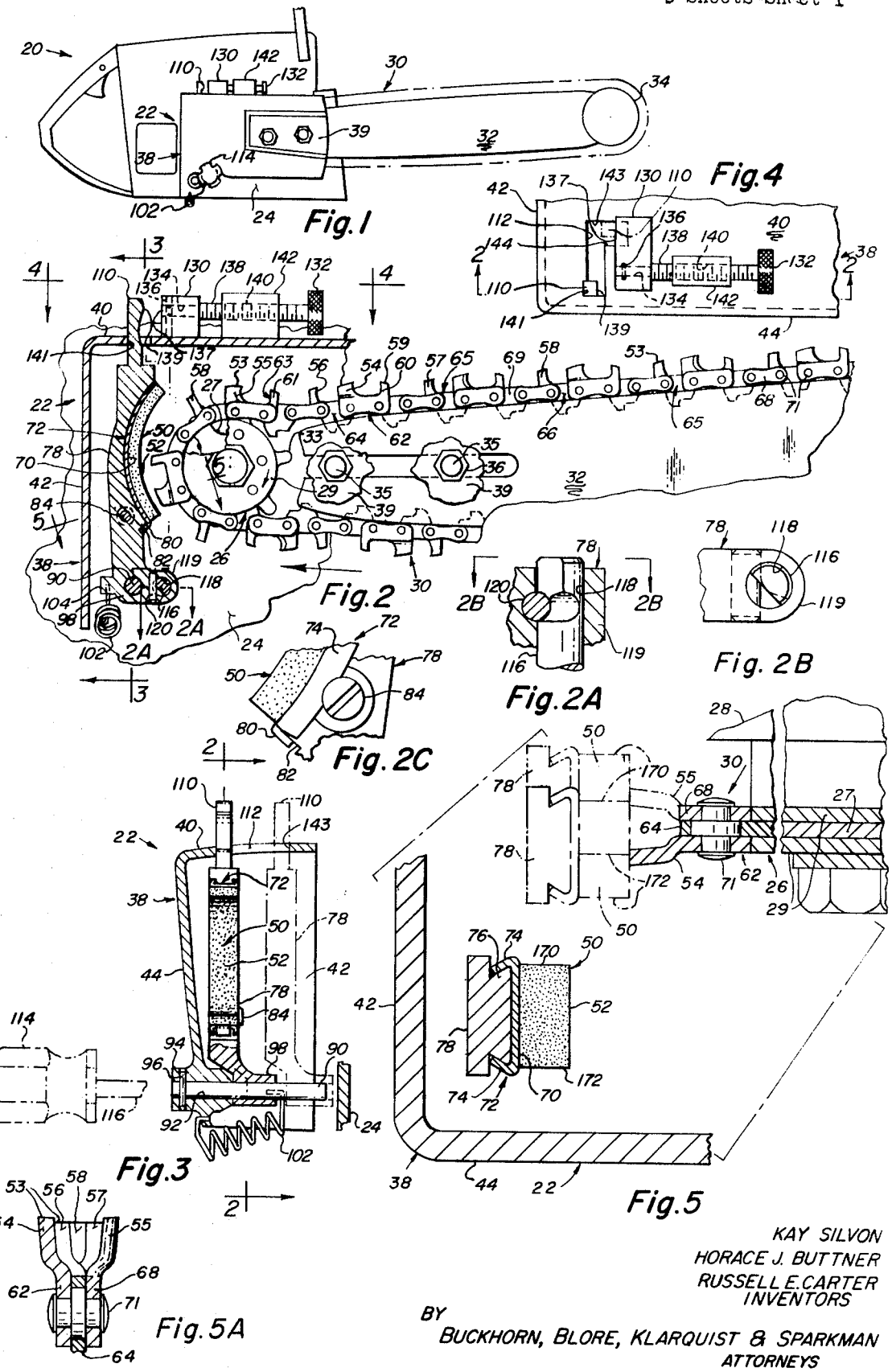

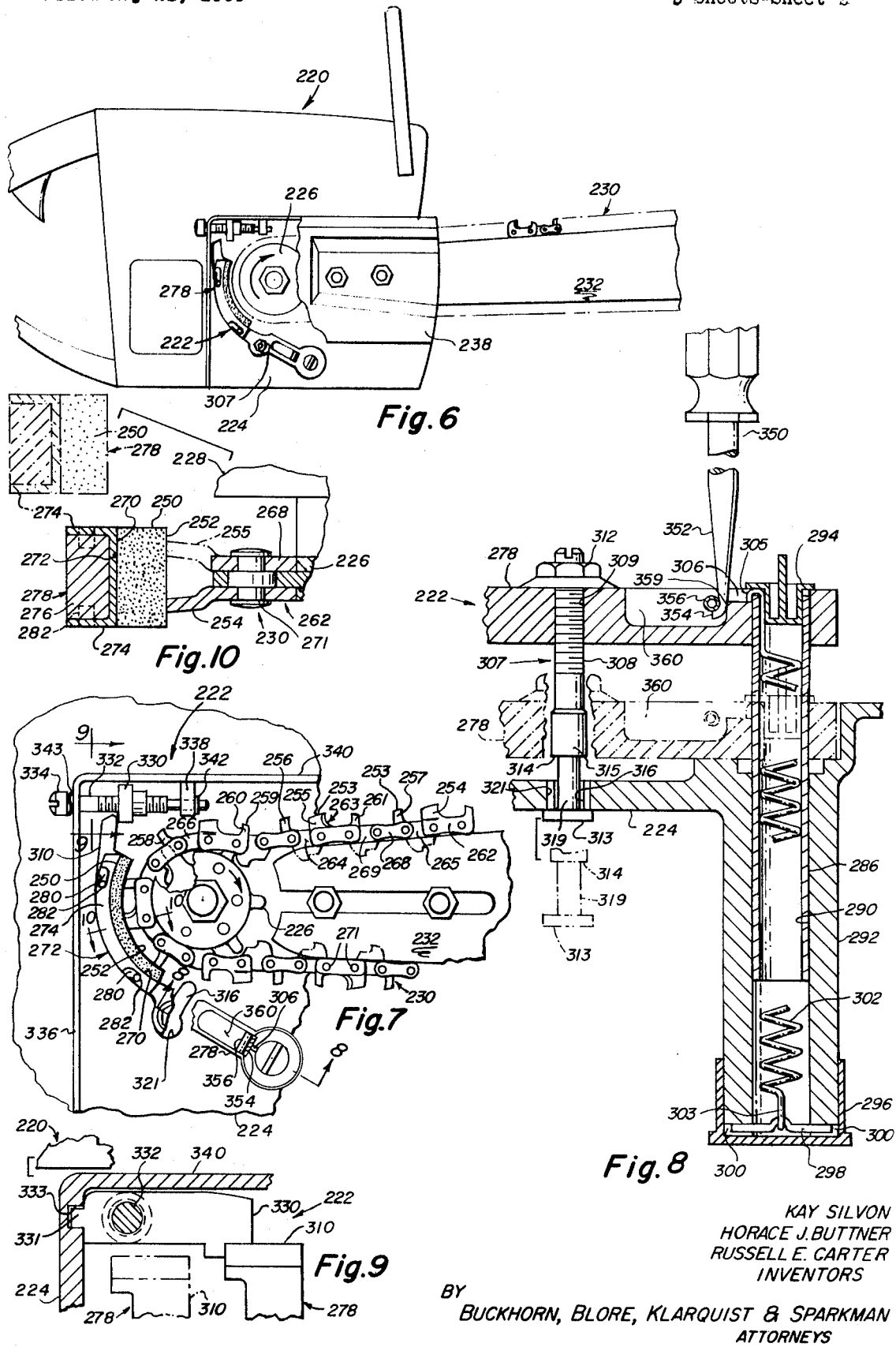

3,516,459
SHARPENERS FOR CHAIN SAWS
Kay Silvon, Portland, Oreg., Horace J. Buttner, New Canaan, Conn., and Russell E. Carter, Portland, Oreg., assignors to Omark Industries, Inc., Portland, Oreg., a corporation of Oregon
Filed May 21, 1965, Ser. No. 457,552
Int. Cl. B27b 13/00
U.S. Cl. 143—32
16 Claims

ABSTRACT OF THE DISCLOSURE

An arcuate abrasive member is mounted on a carrier detachable from a sprocket cover, and is of a length sufficient to always engage at least one tooth. The carrier is movable to dress the abrasive member over the full width of the abrasive member.

---

This invention relates to sharpeners for chain saws, and more particularly to saw mounted sharpeners for saw chains.

In the saw chain sharpeners and methods disclosed and claimed in U.S Pat. 3,040,602, the sharpeners are mounted on chain saws for movement from retracted positions directly behind the driving sprockets of the chain saws to operative positions in which sharpening elements of the sharpeners engage the outer edges of the teeth of the portions of the saw chains traveling around the drive sprockets. These sharpeners and methods of sharpening have provided an important step forward in the chain saw art since they sharpen the saw chains and provide the relief necessary for boring operations and the necessary differences in height between gauges of the saw chains and outer cutting edges of the saw chains. However, it has been found to be desirable to have a unitary saw chain sharpener which is quickly attachable to and detachable from the main frame of a chain saw.

In U.S. Pat. 3,147,644 to Oehrli, there is disclosed in FIGS. 1 to 4 a sharpener including an arcuate sharpening stone, which is used to engage and sharpen a portion of a saw chain traveling around a drive sprocket and is oscillated across the saw chain to attempt to dress the sharpening stone. In this sharpener, as stated in column 5, lines 47 to 58, a groove in the stone is formed by the dressing. While in this Oehrli sharpening stone, the groove is wider than the chain, any groove in the stone lessens the sharpening effected since the interior corners of the groove are inherently rounded and these rounded corners, as they engage the outer, laterally extreme, forward points of the slitter teeth of the saw chain, would make these points somewhat rounded. These points, in a sawing operation, cut the laterally extreme portions or corners of the kerf, and the sharper or less rounded these points of the teeth are, the better is the sawing effected by the saw chain. It has been found desirable to provide a sharpener in which a sharpening member thereof is dressed across the entire face thereof so that no groove whatsoever is created during the sharpening operation. In the Oehrli sharpener, since the sharpening member is pivoted for dressing, to make the distance of oscillation sufficient to dress the entire face of the member and prevent any grooving would require much of the sharpening member to move laterally beyond the path of the projecting elements and reduce the already low stability of the Oehrli sharpening member. This instability would be further increased because of wearing the sharpening surface even further from a portion of a true cylinder than with the distance of oscillation disclosed in the Oehrli patent, such deviation from a true cylindrical surface being inherent from the pivotal dressing movement of the sharpening member.

In the sharpeners disclosed in the above Oehrli patent, adjustment screws engage and force arms carrying the sharpening stones toward the paths of the saw chains to be sharpened. Thus, these feeds of the stones are positive in nature, which type of feed is rigid and unyielding. Rigid, positive feeds have been found to be undesirable generally in sharpening saw chains, and particularly in sharpening a saw chain having teeth and/or depth gauges which are not uniform in height as is the case when one or more new teeth are substituted in a worn chain and sometimes is true of new chains, since roughness in sharpening and damage to such a saw chain and the stone tends to occur during sharpening with a positive feed. In the sharpener of FIGS. 1 to 4 of Oehrli, the arm carrying the stone is deliberately made flexible to permit oscillation of the arm and the stone for dressing, but this flexibility or resiliency, while making the feed of the stone somewhat less positive or unyielding, would not provide sufficient resiliency or cushioning to the feed but would impart instability to the stones and cause rough, non-uniform sharpening with rapid breakout and loss of the abrasive. This proposed structure is, in effect, a resilient, unstable stone-holding device with a positive or rigid feeding means whereas it has been found to be desirable to have a rigid, stable stone-holding device with a soft, yieldable or cushioned feed of the stone toward the saw chain to achieve gradual metal removal from the surfaces sharpened.

In the Oehrli and Carlton sharpeners, there is no positive limitation of movement of any of the sharpening elements toward the saw chain being sharpened, which absence would lessen stability of the sharpening elements. It has been found that stability of the sharpening elements is essential to effect as smooth sharpening as is desired, and that the provision of a stop which positively limits the movement of the sharpening element toward the saw chain greatly increases the stability to cause the sharpening to be smoother, more uniform in depth of cut and more accurate. It has also been found to be desirable to have a saw chain sharpener in which the feed of a sharpening element toward the saw chain is positively limited to limit the sharpening to a predetermined depth of total cut.

The Oehrli sharpening stones and the Carlton sharpening elements, as disclosed in these patents, are so short relative to the spacings between the projecting elements (teeth and depth gauges) of the saw chains that the stones do not continuously engage projecting elements of the saw chain. This only intermittent engagement of the projecting elements would tend to permit flutter of the chain which is preferably avoided. In fact, for smooth sharpening it has been found to be desirable to have a sharpener element having a tooth-engaging portion extending around a sufficiently long portion of the drive sprocket and a saw chain having sufficiently closely spaced projecting elements that the sharpening element always engages at least two of the projecting elements of the saw chain to stabilize the sharpener element and the saw chain even when the saw chain is somewhat loose on the sprocket and the saw bar.

Each of the sharpeners of the above Carlton patent and the above Oehrli patent is always in the plane of the saw chain even when the sharpener is retracted to its storage position so that, if the saw chain would break or come off the drive sprocket, there would be danger of the saw chain striking the sharpener and being damaged and also damaging the sharpener. It has been found to be desirable to have a saw chain sharpener in which a sharpening element is mounted for movement between an operative position generally aligned with the plane of the portion of the saw chain on the driving sprocket and a storage position offset laterally relative to this plane.

It also has been found to be desirable to have in such a sharpener for a chain saw a sharpening stone which will not wear out before a saw chain of the chain saw does so that the shape of the sharpening surface of the sharpening stone is always optimum for the saw chain throughout the life of the saw chain. In the sharpeners disclosed by the above Oehrli patent, the stones, if of wearable, easily dressed abrasive material, would not have sufficient volume to last for the useful lives of the chains so that operators thereof would be required to replace the stones and the chains at different times, which would cause a new chain with its long radius teeth to be sharpened by a worn stone with its short radius of its sharpening surface, which should be avoided whenever possible. It has been found that it is advantageous to match the life of the stone to that of the saw chain. It has also been found to be desirable to provide a saw chain sharpener having a sharpening element which is quickly and simply replaceable when worn out.

An object of the invention is to provide new and improved sharpeners for chain saws.

Another object of the invention is to provide new and improved saw mounted sharpeners for saw chains.

A further object of the invention is to provide a saw mounted sharpener having a quick-replaceable sharpening element.

Another object of the invention is to provide a frame carrying a sharpener and quickly attachable to a chain saw.

Yet another object of the invention is to provide a sharpener for a chain saw mounted on a detachable sprocket cover of the chain saw and including means on the cover for moving a sharpening member into and out of engagement with a saw chain on a drive sprocket of a chain saw.

A still further object of the invention is to provide a sharpener for a chain saw in which a sharpening member is rigidly supported and is fed under the control of adjustable feed regulating means a predetermined distance toward the saw chain with a soft, yielding force during the sharpening operation.

Another object of the invention is to provide a sharpener for a chain saw having a sharpening member which, to dress the sharpening member, is moved back and forth across a saw chain a distance sufficient to dress the entire sharpening face of the sharpening member and prevent the formation of any groove in the sharpening member.

Another object of the invention is to provide a sharpener for a chain saw in which a sharpening member thereof is moved back and forth across a moving saw chain to sharpen the chain and dress the sharpening member and the sharpening member is rigidly supported throughout its movement back and forth across the saw chain.

A still further object of the invention is to provide a saw mounted sharpener for a saw chain including a stop serving to so limit movement of a sharpener element toward a saw chain as to provide a predetermined sharpening cut.

Another object of the invention is to provide a saw mounted sharpener for a chain saw having a sharpening element movable between a storage position offset from the plane of a saw chain of the chain saw to an operative position aligned with the saw chain and engaging the outer edges of teeth of the saw chain.

A further object of the invention is to provide a chain saw sharpener having a sharpening element provided with a concavely arcuate surface for engaging the outer edges of teeth of a portion of a saw chain on a drive sprocket and of sufficient length to always span at least two projecting elements of the saw chain.

The invention provides sharpeners including sharpening members having concavely arcuate sharpening surfaces. Each sharpening member preferably is secured by quick-releasable means to a mounting member, and the mounting member preferably is movable between a sharpening position holding the sharpening member against the outer edges of teeth of a portion of a saw chain traveling around a drive sprocket and a storage position completely outside of the projected area of the portion of the chain traveling around the sprocket so that, if the chain comes off the sprocket, the chain will not strike the sharpening member and thus avoids damage to the chain and/or the sharpening member. Preferably, the concavely arcuate sharpening surface of the sharpening member is of a length sufficient, and the projecting elements of the chain are spaced sufficiently close together that, when the sharpening member is in the sharpening position, the sharpening surface always engages at least two adjacent projecting elements of the saw chain so as to steady the sharpening member and the portion of the chain being engaged by the sharpening member. Preferably, the sharpening surface is of a width greater than that of the kerf width of the saw chain and the mounting member preferably is movable rectilinearly, laterally of the saw chain a sufficient distance to cause the entire width of the sharpening surface to be dressed as it sharpens the saw chain, adjustable stop means preferably being provided for centering the dressing movement of the sharpening surface relative to the chain. There also preferably is provided a stop which is manually adjustable to a position limiting movement of the sharpening member toward the saw chain to provide a selected sharpening cut on the teeth of the saw chain.

A complete understanding of the invention may be obtained from the following detailed description of sharpeners for chain saws forming specific embodiments thereof, when read in conjunction with the appended drawings, in which:

FIG. 1 is a side elevation view of a chain saw and a sharpener forming one embodiment of the invention;

FIG. 2 is an enlarged vertical sectional view of the chain saw and sharpener of FIG. 1 taken substantially along line 2—2 of FIG. 3;

FIG. 2A is an enlarged, horizontal sectional view taken substantially along line 2A—2A of FIG. 2;

FIG. 2B is an enlarged, fragmentary vertical sectional view taken substantially along line 2B—2B of FIG. 2A;

FIG. 2C is an enlarged, fragmentary side elevation view of the sharpener of FIG. 1;

FIG. 3 is an enlarged, vertical sectional view taken substantially along line 3—3 of FIG. 2;

FIG. 4 is an enlarged, top plan view taken substantially along line 4—4 of FIG. 2;

FIG. 5 is an enlarged, horizontal sectional view taken substantially along line 5—5 of FIG. 2;

FIG. 5A is an enlarged, sectional view of a saw chain of the chain saw of FIG. 1 developed to show the profile of the cutting edges of teeth of the saw chain, the depth gauges being omitted for greater clarity;

FIG. 6 is a side elevation view of a chain saw and a sharpener forming an alternate embodiment of the invention;

FIG. 7 is an enlarged, fragmentary, side elevation view of the chain saw and sharpener of FIG. 6;

FIG. 8 is an enlarged sectional view taken substantially along line 8—8 of FIG. 7;

FIG. 9 is an enlarged, vertical sectional view taken substantially along line 9—9 of FIG. 7; and FIG. 10 is an enlarged, horizontal sectional view taken substantially along line 10—10 of FIG. 7.

EMBODIMENT OF FIGS. 1 TO 5

Referring now in detail to the drawings, there is shown in FIGS. 1 to 5 a chain saw 20 mounting a sharpener 22 forming a unitary attachment. The chain saw includes a side frame casting 24 which forms a part of the main frame of the chain saw and, while in the chain saw disclosed herein, is a separate part thereof, may be integral with the casting of the engine serving as the source of motive power for the chain saw and serving to rotate drive sprocket 26 through clutch members 28 (FIG. 5) in a clockwise direction, as viewed in FIG. 1. The sprocket preferably is of the type disclosed in the above-mentioned Pat. 3,040,602, which includes a central, toothed portion 27 and side discs 29, which serve to support side links of an endless saw chain 30 driven by and coursing around the drive sprocket. The toothed portion 27 of the sprocket has teeth 33 serving to advance the saw chain around the drive sprocket and a saw bar 32 having a nose portion 34 of substantially greater radius than that of the drive sprocket. The nose portion 34 may be of the roller type to minimize heating the saw chain. The saw bar is attached rigidly to the casting 24 by studs 35 and nuts 36 which form quick-releasable attachment or clamping means for the saw bar and for a cover 38, which has a mounting portion 39 fitting over the studs and bearing against shims (not shown) between the portion 39 and the saw bar or, if a guide plate is used, bearing against the guide plate. The cover 38 serves as the frame of the sharpener 22 and also serves to cover the drive sprocket. The cover 38 has a top flange 40 and a rear flange 42 integral with body portion 44 thereof.

An arcuate sharpening member 50, initially of uniform thickness throughout its length, has an elongated, concavely arcuate or cylindrical sharpening surface 52 subtending an angle of about 90°, the radius of which, when new, is slightly greater than the radius of the path of travel of elongated, arcuate tips or edges 53 of slitter teeth 54 and 55 and raker teeth 56, 57 and 58, and elongated, arcuate tips or edges 59 of depth gauges 60 and 61 of the saw chain 30, when the saw chain is new, as the teeth and depth gauges, which are the outwardly projecting elements of the saw chain, travel around the drive sprocket 26. The sharpening member is mounted, as will be presently described, for such movement into engagement with the tips of the outwardly projecting teeth and depth gauges, when the sharpening member and the saw chain are both new, that initially only the central portion of the sharpening member engages the tips of the saw chain to provide clearance at the entrance end of the sharpening member to accommodate any irregularities of the saw chain. This protects the sharpening member and the teeth of the saw chain from accidental damage. During the first sharpening cut on the saw chain, the sharpening member equalizes all the teeth 54 and 55 in height, equalizes all the teeth 56, 57 and 58 in height and also equalizes the height of all the depth gauges. After several sharpening cuts have been made, the member 50 wears sufficiently that the surface 52 and the arcuate tips 53 and 59 all have the same radius. The teeth 54 and 55 are slitters and are integral parts of allochiral side slitter links 62 and 63. The teeth 56 and 57 (FIG. 5A) are side rakers positioned laterally inwardly relative to the teeth 54 and 55 and forming integral parts of allochiral center drive links 64 and 65 (FIG. 2). The teeth 58 (FIG. 5A) are center rakers forming integral parts of central drive links 66 (FIG. 2). Untoothed side links 68, untoothed central drive links 69 and rivets 71 complete the chain.

The saw chain 30 may be of any type which can be sharpened by abrading the tips 53 and also the tips 59 of the depth gauges 60 and 61, if depth gauges are present. The cutters preferably are of a material commonly used for saw chain cutters such as, for example, steel or an alloy steel which can be ground by conventional abrasive materials. The portions of the kerf cut by the slitter teeth 54 and 55 overlap the portions of the kerf cut by the side raker teeth 56 and 57, respectively, and the portion of the kerf cut by the center raker teeth 58 overlaps the portions of the kerf cut by the side raker teeth 56 and 57. Each leading edge of the tips 53 of the slitter teeth 54 and 55 is substantially closer than is the rear edge of the outer tip 59 of the depth gauge immediately thereahead and on the same linke to a line extending at right angles to and through the midpoint of a second line joining the pivot axes of the link of which the tooth and depth gauge form parts. This provides the desired difference in height between the outer cutting edge of the slitter tooth which is at the forward end of its tip and the highest portion of the depth gauge, which highest portion is at the rear end of the tip of the depth gauge. Also, the teeth 54 to 58 are all behind the midpoints of the links of which they form parts so that the tips of the teeth provide desired relief or clearance for the remainder of the tips 53 behind the forwardly positioned cutting edges on such tips of the teeth. The slitter teeth have side clearance in addition to the relief of the tips thereof and also have side slitting edges as is well known in the art. The raker teeth 56 to 58 are positioned somewhat farther behind the midpoints of their respective links than are the slitter teeth 54 and 55 so that the tips of the raker teeth are somewhat lower than are the tips of the slitter teeth, as illustrated in FIG. 5A.

The sharpening member 50, as disclosed in FIGS. 1 to 5, is an abrasive stone of any suitable, well known, wearable, easily dressable, abrasive material, and is bonded by a suitable, well known adhesive to arcuate face 70 of a holding shoe 72. The adhesive may be an epoxy compound. The face 70 forms a portion of a cylinder and is concentric with the arcuate sharpening surface 52 when the sharpening surface has been worn in, as described above. The shoe 72 preferably is a stamping of sheet steel and has arcuate flanges 74 forming the sides of an arcuate, dovetail groove adapted to fit closely and slidably on arcuate dovetail portion 76 of an arm 78 forming carrier means serving to carry the shoe. The shoe has an end tab or stop 80 adapted to engage stop shoulder portion 82 of the arm 78 to form a positive interlock with the arm to limit movement of the shoe relative to the arm 78 in a clockwise direction, as viewed in FIG. 2, which direction is the same as that in which the saw chain 30 travels around the sprocket. A slotted head of a screw 84 threaded into a tapped bore in the arm 78 engages the adjacent portion of the shoe and clamps the shoe tightly in assembled position on the arm 78. The screw 84 and arm 78 form quick-releasable clamping means for the shoe 72 and the sharpening member thereon.

The arm 78 is mounted for reciprocating or rectilinear movement on a guide rod 90 (FIG. 3) rigidly mounted in a bore 92 in a boss portion 94 of the cover 38. A pin 96 locks the rod 90 rigidly to the cover. The rod 90 extends perpendicularly to the plane in which the chain 30, the sprocket 26 and the saw bar 32 lie. The arm 78 has an elongated sleeve or bearing portion 98 fitting closely and slidably and rotatably on the rod 90. The bearing portion is offset from the main body portion of the arm 78. A spring 102 is secured at one end to a lug 104 (FIG. 2) of the arm 78 and at the other end to the lower edge portion of the body portion 44 (FIG. 3) of the cover 38. The spring urges the arm 78 to the left, as viewed in FIG. 3, along the rod 90 and counterclockwise, as viewed in FIG. 2, about the rod 90 toward a storage position shown in full lines in FIGS. 2 to 5 in which the arm 78 and the sharpening element 52 are completely out of the plane (the projected area) of the saw chain 30. In its storage position, the sharpening member 50 also has been swung back away from the path of the outer tips 53 and 59 of the teeth 54 to 58 and the depth gauges 60 and 61 of the saw chain, as illustrated in FIG. 2.

The arm 78 has a reduced, free end portion 110 (FIGS. 2 and 4) extending through and guided by a generally L-shaped slot 112 in top flange 40 of the cover 38. A handle 114 having a centered, knob-like handle portion also has a hooked or grooved end portion 116 adapted to be moved under the cover 38, slid into a bore 118 in a lug portion 119 of the arm 78 and then turned in the bore to bring the hooked portion into interlocking engagement with a pin 120 extending through the bore. The handle 114 may then be grasped and serves both to slide the arm 78 rectilinearly along the rod 90 and to swing the arm 78 on the rod 90 with a low, impositive force. The handle is connected to the arm 78 quite near to the pivot axis of the arm so that tendency of the arm to bind on the rod 90 is minimized and also the knob-like handle portion, which is centered on the shank of the handle, makes the leverage of the handle on the arm low to make the force tending to swing the arm toward the sprocket soft and yielding or cushioned as it is manually applied so that the operator has the feel of the feed force applied.

A feed-regulating device includes a rectangular stop 130 (FIGS. 2 and 4), preferably of nylon, slidable along the top flange 40 of the cover 38 by an adjustment screw 132 having an end rotatable in bore 134 in the stop 130 and secured therein by a known connection 136 which permits rotation of the screw in the stop but prevents relative longitudinal movement therebetween. The adjustment screw has a fine thread 138 threaded through tapped bore 140 in a lug 142 which is integral with the cover 38. The stop has an elongated rear face 137 in the path of the end portion 110 of the arm which limits the extent to which the sharpening member 50 may be swung toward the drive sprocket 26 while permitting rectilinear or straightline motion transversely of the plane of the saw chain 30. The end portion 110 has a rounded stop-engaging surface 139 which is elongated and forms a portion of a cylinder. The end portion 110 is held in its storage position by a notch 141 (FIGS. 2 and 4) of the slot 112, the spring 102 urging the arm into the notch. The notch prevents accidental movement of the sharpening member 50 into the plane of the saw from vibration or the like. After the sharpening member has been moved into the plane of the saw chain, the arm 78 may be swung toward the drive sprocket and the end portion 110 is moved in between guide edges 143 and 144 of the slot and toward the stop 130. Rectilinear movement of the arm 78 then is possible as limited by the edges 143 and 144. The cover 138 is shimmed, if necessary, on the saw bar to so position the guide edges 143 and 144 of the slot as to center the back and forth movement of the sharpening member relative to the centerline of the chain. That is, the path of the dressing movement or throw of the sharpening member extends transversely across the chain and the ends of the path of the dressing movement are at opposite sides of the centerline of the chain and are equidistant from the centerline of the chain.

Preferably the volume of the useful portion of the sharpening member is made great enough that the useful life of the sharpening member 50 is matched to that of the saw chain 30, such matching preferably being such that the useful life of the sharpening member is just slightly greater than that of the chain but not sufficiently greater that there would be any doubt that the sharpening member is almost completely worn out when the chain is worn out. This causes both the sharpening member, with its mounting shoe 72, and the saw chain to be replaced at the same time. Hence, the radius of the sharpening surface of the stone is always at least approximately matched to the radius of the path of the tips of the projecting elements of the portion of the saw chain on the drive sprocket. Also, the operator need never check the condition of the stone but can rely on the condition of the chain to determine when replacement is necessary.

In the operation of the sharpener 22, the handle 114 is connected as described above to the arm 78 which is in its storage position. The operator of the saw turns the screw 132 through a selected angle to move the stop 130 a predetermined distance to the right as viewed in FIGS. 2 and 4 to set the sharpening cut to be made on the teeth 54 to 58 and depth gauges 60 and 61. While the saw chain is in motion, the operator then pushes the arm 78 from its retracted position as shown in full lines in FIG. 3 into the plane of the saw chain 30 as shown in broken lines in FIG. 3, and then swings the arm clockwise, as viewed in FIG. 2, to press the sharpening member 50 to its operating position in engagement with the tips 53 and 59 of the teeth and depth gauges of the saw chain 30 as it is advanced by the drive sprocket 26. The sharpening surface 52 at this time, assuming the surface to have been worn in previously, is centered on the axis of rotation of the drive sprocket and is coincident with the path of the tips 53 and 59 so that the sharpening member smoothly abrades the tips, thereby sharpening the kerf-cutting edges of the teeth and correspondingly reducing the height of the depth gauges.

The operator, as he presses the sharpening member 50 against the teeth of the saw chain, slowly reciprocates the arm 78 back and forth along the guide rod 90 between extremes determined by the end portion 110 of the arm 78 engaging the edges 143 and 144 of the slot. The length of such reciprocation and the width of the sharpening surface 52 of the sharpening member 50 are such, relative to the kerf width or distance between the lateral extremes of the tips 53 of the teeth 54 and 55, that sides 170 and 172 of the sharpening member alternately move only partially over the tips of the teeth 54 and 55. That is, the side 170, when the sharpening member 50 is in the extreme lowermost position shown in broken lines in FIG. 5, is substantially below the uppermost extremity of the tooth 55, and the side 172, when the sharpening member is at its extreme uppermost position shown in broken lines in FIG. 5, is substantially above the lowermost extremity of the tooth 54, the tips of teeth 54 and 55, the teeth being slitters, being positioned at the extreme opposite sides of the saw chain. This distance of reciprocation of the sharpening member is sufficient that, throughout the life of the chain and even when the tips of the teeth have been worn down as far as is practical so that the kerf width is at a minimum, the sides 170 and 172 alternately are moved completely inside of the lateral extremes of the kerf or path of the tips of the teeth. Thus, this reciprocation insures complete dressing of the sharpening member 50 over the entire width thereof and prevents the formation of any groove therein. For example, in one constructed embodiment of the chain saw 20, the width of the sharpening member 52 was about .440 inches, the kerf width of the chain, when new, about about .330 inches and the length of reciprocation in dressing was about .19 inches.

The sharpening is continued after the rounded stop-engaging surface 139 of the end portion 110 of the arm 78 comes into contact with the face 137 of the stop 130, which face 137 extends parallel to the guide rod 190, until the "sparking out" capacity or inherent flexibility of the arm 78 and the member 50, and play between the saw chain and the sprocket are used up. When the teeth have been ground to the extent that sparking out ceases, further sharpening is prevented, the desired sharpening cut or depth of abrasion having been effected. By the provision of this structure which limits the sharpening to a selected, precise sharpening cut, the depth of each sharpening operation is precisely effected and all the sharpening cuts may be effected at a uniform, optimum depth. The usual sharpening cut will be, as selected by the operator, between about .002 and .005 inch, and the stop may be set in advance or, if desired, the stop may be retracted slowly as the sharpening progresses. The stop serves to prevent the sharpening member from being advanced too far and limits the force with which the sharpening member can be pressed against the chain. Also, the engagement of the elongated rounded surface 139 with the elongated stop face 137 stabilizes the arm 78 and sharpening member, especially during the final sparking out as the sharpening and dressing are completed.

The connection of the handle 114 to the arm 78 is much closer to the pivot axis of the arm 78 than is the sharpening member 50 which makes the feed force applied to the sharpening member low. Thus, the normally applied force of the operator to the handle to swing the arm 78 and the sharpening member toward the saw chain causes only a low, yielding or impositive feeding force to be applied to the sharpening member. Also, since the portions of the hand of the operator on the handle are yielding or cushioned, the feed force applied to the sharpening member is a soft, cushioned or resilient force. This feed force is sufficient to cause the sharpening to be effected quickly but is sufficiently soft that the sharpening operation is very smooth. Thus, a cushioned feed is effected while the mechanism supporting the sharpening member is quite rigid and precise to provide maximum stability of the sharpening member.

To effect stabilization of the saw chain during sharpening and provide maximum speed, smoothness and uniformity of sharpening, the length of the sharpening surface 52 must be at least sufficient to span completely at least two of the elongated, outer, arcuate tips or edges 53 and 59 of the teeth of 54 to 58 and the depth gauges 60 and 61. By this length, at least two of these projecting elements to be ground down will always be fully engaged by the sharpening surface which tends to hold the links so engaged against the sprocket as the third projecting element comes into engagement with the sharpening surface. This aids in holding the link of which the third projecting element forms a part in a chordal position on the sprocket to insure proper entry of the third projecting element into engagement with the sharpening surface. Since, during sharpening, the sharpening surface always engages a plurality of the projecting elements, radial deviations of the chain links as a result of any slack in the chain will be minimized. As the saw chain is advanced by the drive sprocket, the sprocket teeth 33 engage the central drive links 64, 65, 66 and 69 and drive the chain. This driving engagement with each drive link tends to move the drive link counterclockwise, as viewed in FIG. 2, from its desired chordal position relative to the sprocket. However, as each of the raker teeth, which form portions of the drive links, comes into engagement with the sharpening member 50, the slitter link 62 or 63 just ahead of that raker tooth and its associated side link 68 are held by the member 50 in engagement with the discs 29 in chordal positions relative to the sprocket and the slitter link and its associated side link prevent the forward portion of the immediately following drive link from swinging away from the sprocket. This keeps the drive link chordal to the sprocket so that the raker tooth is properly positioned as it comes into engagement with the sharpening member. While the drive link 69 immediately ahead of each slitter link 62 and 63 has no outwardly projecting element engageable by the sharpening member, the tendency of the driving engagement of the sprocket with that drive link to turn it counterclockwise tends to hold the forward end of the slitter link against the sprocket so that the depth gauge is in desired position as it engages the sharpening member. As each slitter tooth 54 and 55 comes into engagement with the sharpening member, the slitter link 62 or 63 carrying the slitter tooth is held in chordal engagement with the sprocket by engagement of the full length of the tip 59 of the depth gauge of that link by the sharpening member.

EMBODIMENT OF FIGS. 6 TO 10

A chain saw 220 mounts a sharpener 222 forming an alternate embodiment of the invention. The chain saw 220 is generally similar to the chain saw 20 (FIG. 1) and includes a side frame casting 224 forming a separable portion of the main frame of the chain saw. The engine of the saw serves to rotate drive sprocket 226 through a known clutch member 228 in a clockwise direction, as viewed in FIG. 6. The sprocket advances endless saw chain 230 coursing on the drive sprocket around the drive sprocket and a saw bar 232 having a nose portion (not shown) of substantially greater diameter than that of the drive sprocket. A cover 238 covers the sharpener and the drive sprocket.

The sharpener 222 has a sharpening member 250 (FIGS. 7 and 10) similar to the sharpening member 50 (FIGS. 2 and 5) and having an elongated, concavely arcuate sharpening surface 252 initially larger but equal, after being worn in, in radius to that of the path of travel of arcuate outer tips or edges 253 of teeth 254 to 258 and arcuate outer tips or edges 259 of depth gauges 260 and 261 of the saw chain 230 as the teeth and depth gauges travel around the drive sprocket 226. The chain 230 is identical to the chain 30 with the teeth 254 and 255 being slitters and being part of, with the depth gauges 260 and 261, side links 262 and 263, the teeth 256, 257 and 258 being rakers and parts of central drive links 264, 265 and 266 respectively. Plain, untoothed side links 268, untoothed drive links 269 and rivets 271 complete the chain. The sharpening member 250 preferably is a dressable abrasive stone of suitable, well known abrasive material bonded by an adhesive to arcuate face 270 of a holding shoe 272. The face 270 forms a portion of a cylinder and is concentric with the arcuate shapening surface 252 when the latter has been worn in. The shoe 272 is generally U-shaped in transverse cross-section and arcuate side flanges 274 thereof fit closely and slidably on an arcuate portion 276 of an actuator arm or carrier 278. Slots 280 in the flanges 274 slide over pins 282 of the arm 278 to limit positively movement of the shoe relative to the arm 278 in a clockwise direction as viewed in FIG. 7, which direction is the same as that in which the saw chain 230 is advanced around the sprocket 226. These pin-and-slot connections also wedge to lock the shoe 272 on the arm 278, and form quick-releasable attachment or clamping means, and form a positive interlock preventing movement of the sharpening member relative to the arm in the direction of travel of the chain around the sprocket.

The arm 278 is pinned rigidly or otherwise keyed to elongated, hollow shaft or sleeve 286 (FIG. 8) which is mounted for reciprocating or rectilinear movement closely in a guide bearing 290 in an elongated, tubular bearing portion 292 of the frame 224. The bearing 290 extends perpendicularly to the plane in which the chain 230, the sprocket 226 and the saw bar 232 lie. A removable dust cap 294 covers the outer end of the hollow shaft 286 and a dust cap 296 covers the opposite end of the tubular bearing portion 292. A keying pin 298 is retained in keying notches 300 in the end of the bearing portion 292 by a combined tension and torsion spring 302. The spring is secured to and keyed to the pin 298 by a hooked end 303 thereof and a looped or notched portion of the pin. At the outer end of the spring, a hooked end 305 of the spring fits into and is keyed by notched portion 306 of the arm 278, the hooked end 305 hooking over the end of the hollow shaft. The spring urges the arm 278 downwardly, as viewed in FIG. 8, along the guide bearing 290 and counterclockwise, as viewed in FIG. 7, about the bearing toward a storage position shown in broken lines in FIG. 8 in which the arm 278 and the sharpening member 250 are completely out of the plane of the saw chain 230. In the storage position, the sharpening member 250 also has been swung away from the path of the outer tips of the teeth and depth gauges of the saw chain.

A pin 307 (FIG. 8) has a threaded shank 308 slotted at its end for screwdriver engagement and screwed into tapped bore 309 in the arm 278. A nut 312 locks the pin 307 to the arm 278 in adjusted position in which a head 313 and a face 314 of enlarged or collar portion 315 of the pin are spaced predetermined distances from the arm 278. A reduced portion 319 of the pin 307 will pass freely through an arcuate slot 316 (FIGS. 7 and 8) in the side frame casting 224 while the collar portion 315 and the head 313 are too large to enter the narrow portion of the arcuate slot 316. The collar portion 315 is movable through enlarged end portion 321 of the slot when the arm is in a retracted position swung away from the chain 230. However, the head 313 is too large to go through the portion 321 of the slot. The length of the reduced portion 319 less the thickness of the portion of the casting 224 adjacent the slot 316 determines the range of movement or throw of the arm 278 laterally of the saw chain 230 during a sharpening operation, such movement being provided for dressing the sharpening member 250 during the sharpening. This movement is sufficiently long that, during dressing movement, the side edges of the sharpening member will always move alternately completely inside of the adjacent edges of the path of the tips of the teeth of the chain no matter how worn the chain is, whereby the entire width of the sharpening member is always dressed and no groove is ever formed therein. The pin 307 and the slotted casting 224 serve to limit the back and forth movement of the arm 278 and sharpening member 250 carried thereby. The pin 307, with the nut 312 loosened, is adjusted relative to the arm 278 to center the dressing movement relative to the saw chain so that the dressing of the sharpening surface is uniform across the entire width thereof. That is, when the sharpening member is at one end of its throw, one side of the sharpening member is offset the same distance from the centerline of the chain that the other side of the sharpening member is offset from the centerline of the chain when the sharpening member is at the other end of its throw. The nut 312 then is tightened to lock the pin 307 in this position.

The arm 278 has an L-shaped free end portion 310 (FIG. 7) of substantial width and adapted to engage stop block 330 mounted on and threadedly engaging adjustment screw 332 having a slotted head 334 positioned outside a flange 336 of the frame 224 and mounted rotatably by a lug 338 on a flange 340 of the side frame casting 224. A snap ring 342 fitting in a groove in the screw and a spring washer 343 positioned between the head of the screw and the flange 336 restrain the screw against axial movement relative to the lug 338. The stop 330 is slidable along the side frame casting and has a splining or keying portion 331 (FIG. 9) slidable along a splining or keying slot 333 in the side frame casting to prevent rotation of the stop 330 relative thereto. The slot 333 is parallel to the adjustment screw and the plane of the saw bar and the saw chain. The stop serves to limit the depth of the sharpening cut by limiting forward movement of the arm 278 to a selected, precise position. The stop may be set at the start of the sharpening operation to provide the entire sharpening cut, or, if desired, can be slowly retracted during the sharpening to cause the sharpening member to be fed incrementally. A detachable handle 350 (FIG. 8) has a centered, knob-like handle portion and a tapered, screwdriver-like blade 352 provided with a hook 354 adapted to lock between roll pin 356 and shoulder 359 forming one wall of a recess 360 in the arm 278. The pin 356 is secured to the arm quite close to the pivot axis of the arm and extends across the recess 360.

The length of the sharpening surface 252 and the spacings between the teeth 254 to 258 and depth gauges 260 and 261 (the outwardly projecting elements of the saw chain 230) are such that the surface 252 always spans at least two of the outwardly projecting elements. The useful volume of the sharpening member 250, when new, is preferably just greater than that needed to sharpen the teeth of the chain 230 throughout the useful life of the chain. Hence, whenever a new chain is substituted for one that is worn out, a new sharpening member is substituted for the substantially worn out sharpening member. This keeps the shape of the sharpening surface matched to the arcuate path of the tips of the projecting elements of the portion of the saw chain on the drive sprocket, and also provides maximum convenience in maintenance of the chain saw.

In the operation of the sharpener 222, the operator may turn the adjustment screw 332 through a selected extent of rotation in a direction to move the stop 330 to the right, as viewed in FIG. 7, a predetermined distance from its starting position which had previously been utilized to limit the preceding sharpening operation to provide a selected sharpening cut. Then the operator attaches the handle 350 to the arm 278, starts the engine of the saw, if the saw is not running, and pulls the handle in a direction extending directly away from the side frame casting 224 against the action of the spring 302 to pull the collar portion 315 completely through the enlarged portion 321 of the slot 316. The arm 278 will now be in the plane of the saw chain but retracted away from engagement with the saw chain. The handle then is moved to swing the sharpening member 250 into engagement with the saw chain to sharpen the tips 253 and 259. As the sharpening proceeds, the operator moves the arm 278 and sharpening member 250 slowly back and forth rectilinearly relative to the plane of the chain to dress the sharpening member. This reciprocation is limited by the head 313 and collar portion 315 alternately engaging the side frame casting 224. The sharpening is stopped after the end portion 310 has engaged the stop 330 and all the flexibility of the arm and play of the chain are used up, the stop then serving to prevent further movement of the sharpening member 250 in a clockwise direction, as viewed in FIG. 7. At this time, just the desired degree of sharpening has been effected and the operator permits the arm to swing away from the chain and be pulled back to its storage position completely out of the plane of the saw chain 230. The length of the reciprocation of the sharpening member 250 and the width of the sharpening surface 252 thereof are such, relative to the kerf width or distance between the lateral extremes of the saw chain, that the entire width of the surface 252 is dressed uniformly no matter how worn are the teeth of the chain. If desired, instead of retracting the stop 330 at the start, the stop can be slowly retracted a predetermined distance during the sharpening operation.

The above-described sharpener 22 may be installed on a chain saw, either new or used, merely by bolting on the cover 38 while the sharpener 222 may be installed on a chain saw by installing the side frame casting 224 thereon. The sharpening members 50 and 250 are held in the storage positions thereof completely out of the projected areas of the saw chains 30 and 230 so that no damage is done to the saw chains and sharpeners if the chains break or come off the drive sprockets. The sharpeners 22 and 222 provide very smooth, uniform, preselected depths of sharpening with yielding, cushioned feeds and rigid, precise mountings of the sharpening members. Consequently, a minimum total cut for each sharpening operation may be made and still insure full sharpening, which greatly extends the life of the saw chains while keeping them fully sharpened. The stops and the lengths of the sharpening members stabilize the sharpening members during sharpening operations to contribute to the smooth sharpening effected by the above sharpeners.

It is to be understood that the above-described arrangements are simply illustrative of the application of the principles of the invention. Numerous other arrangements may be readily devised by those skilled in the art which will embody the principles of the invention and fall within the spirit and scope thereof. For example, instead of the edges 143 and 144 of the slot 116 (FIG. 4) being used to limit the dressing movement, the slot 116 may be much wider than disclosed above, the stop 130 be provided with parallel arms bracketing the end portion 110 of the arm 78 to limit the dressing movement, and the lug 142 be a portion of an L-shaped bracket adjustable across the top flange 40 of the cover 38 by slots in the bracket through which securing studs or capscrews project to center the dressing throw, shimming of the cover 38 on the saw bar 32 then being unnecesary. Also, if desired, the stop mechanism of the sharpener 22, which includes the lug 142, the stop 130 and the adjustment screw 132, may be of the type of the sharpener 222 and be mounted on the inside of the cover 138 except for the head of the adjustment screw.

What is claimed is:
1. In combination with a chain saw including a main frame, an engine having a drive shaft, a saw bar, clamp means securing the saw bar rigidly to the frame, a drive sprocket on the drive shaft, and a saw chain coursing on the drive sprocket and the saw bar, a sharpening attachment comprising a cover member detachably secured rigidly to the main frame portion by the clamp means in a position covering the sprocket, a holder, a sharpening member held by the holder, and carrier means mounting the holder on the cover member for movement between a first position in which the sharpening member is spaced away from the saw chain and a second position in which the sharpening member engages teeth of the portion of the saw chain on the sprocket.

2. In a chain saw, a main frame, an arcuate guide member mounted on the main frame, a saw chain in a predetermined plane and driven along and coursing around the arcuate guide member, an elongate, arcuate sharpening member, means mounting the sharpening member for movement from a first position out of engagement with the saw chain to an operating position engaging the saw chain, and guide means extending perpendicular to said plane and guiding the mounting means in only a straight line to move the sharpening member back and forth in a straight line movement across the saw chain to dress the sharpening member.

3. In a chain saw, a main frame, an arcuate guide member mounted on the main frame, a saw chain in a predetermined plane and driven along and coursing around the arcuate guide member, a sharpening member, guide means extending perpendicularly to said plane, an arm carrying the sharpening member and mounted pivotally on and slidably in only a straight line along the guide means, and means for moving the arm to move the sharpening member into engagement with the saw chain and back and forth across the saw chain to sharpen the saw chain and dress the sharpening member.

4. In combination, a saw chain provided with teeth spaced therealong and having a predetermined kerf width, means for advancing the saw chain along a predetermined path having a curved portion, a sharpening stone having a curved sharpening surface of a predetermined width greater than that of the kerf width, means mounting the stone adjacent the curved portion of the path for movement into engagement with the teeth of the chain and for movement laterally of the chain back and forth across the chain, means for moving the stone into engagement with the chain, and means for moving the stone back and forth across the chain between a first extreme lateral position in which one side edge of the sharpening surface of the stone is completely between the side edges of the path of the tips of the teeth of the saw chain and a second extreme lateral position in which the other side edge of the sharpening surface is completely between the side edges of the path of the tips of the teeth of the saw chain.

5. In a chain saw, a side frame casting having a top flange and a rear flange.

a saw bar, means securing the saw bar to the casting, a drive sprocket mounted on the casting at one end of the saw bar, a saw chain on the saw bar and drive sprocket having allochiral slitter teeth, depth gauges and raker teeth and advanced by the drive sprocket, the teeth and depth gauges of the saw chain having arcuate outer tips centered on the axis of the drive sprocket when on the drive sprocket and defining an arcuate path of a predetermined width as they travel around the sprocket, the side frame casting having an elongated, inwardly extending tubular bearing portion positioned below the drive sprocket and having a pair of aligned notches in the inner end thereof, a tubular shaft slidable and rotatable in the bearing portion and having a notch in the outer end thereof, an arm fixed at one end thereof to the outer end of the tubular shaft and having an arcuate portion extending partly around the rear end of the portion of the saw chain on the drive sprocket and having an upper end portion, a rod member in the aligned pair of notches.

a combined torsion and tension spring in the tubular shaft having a first hook portion hooked over the rod member and a second hook portion hooked over the outer end of the shaft portion and fitting into the notch therein, the spring serving to urge the arm rearwardly away from the drive sprocket and laterally toward a storage position adjacent the casting and out of the projected area of the saw chain, the arm having a recess therein adjacent the lower end thereof, a pin extending across the recess and secured to the arm a handle having a centered, knob-like handle portion and a hooked, blade portion at one end thereof adapted to hook under the pin and fit closely between the pin and one end of the recess for swinging the arm away from the sprocket and for moving the arm rectilinearly toward and away from the casting.

a channel-like arcuate shoe adapted to fit onto the arcuate portion of the arm, the arm and the shoe having pin-and-slot connecting means adapted to limit movement of the shoe with the saw chain and hold the shoe on the arm, an arcuate stone of a predetermined width and subtending an angle of at least 90° carried by the shoe for engaging the chain, the casting having a slot therein having a wide lower portion and a narrow upper portion, a rod member secured adjustably at one end to the arm and extending through the slot in the casting, the rod member having a head at the other end which is too large to go through the slot, a reduced portion of a predetermined length adjacent the head of a diameter adapted to be moved axially and laterally through both the upper and lower portions of the slot, and an enlarged portion at the end of the reduced portion opposite to the head of a diameter small enough to pass through the lower portion of the slot and too large to pass through the upper portion of the slot, the length of the reduced portion of the rod being sufficiently greater than the thickness of the portion of the casting adjacent the upper portion of the slot relative to the respective widths of the path of the tips of the chain and the stone that the movement of the arm toward and away from the casting, when the stone is in engagement with the chain, is between a first extreme position in which one side of the stone is between the sides of the path of the tips of the chain and a second extreme position in which the other side of the stone is between the sides of the path of the tips of the chain, the top flange of the casting having a downwardly projecting lug spaced forwardly from the rear flange of the casting and having a hole therein, the rear flange of the casting having a hole therethrough aligned with the hole in the lug, an adjustment screw mounted rotatably in the holes in the lug and the rear flange and having a head positioned rearwardly of the rear flange, washer means on the screw ahead of the lug for limiting rearward movement of the screw, a spring washer positioned between the head of the screw and the rear flange and urging the screw rearwardly until the washer means engages the lug, the casting having a slot extending along the screw, a stop threaded on the screw and having a splining portion projecting into the slot extending along the screw and having a stop face in the path of the upper end of the arm for limiting movement of the arm toward the sprocket, the stop face being of a length sufficient that it is engaged by the arm throughout movement of the arm back and forth relative to the casting during the sharpening and dressing operation.

6. In a chain saw including in combination with a main casting, a saw bar having a slotted mounting portion, a pair of stud means clamping the saw bar to the main casting, a drive sprocket having a central toothed portion and a pair of discs bracketing the toothed portion, sprocket drive means mounting the sprocket at one end of the saw bar and serving to rotate the sprocket, and a saw chain provided with allochiral slitter links having teeth provided with arcuate tips and depth gauges provided with arcuate tips and raker links having teeth provided with arcuate tips, the saw chain being mounted on the saw bar and the drive sprocket and being drivable by the drive sprocket, the tips of the slitter teeth defining the lateral extremes of the path of the tips of the teeth and depth gauges, a sharpener comprising a cover having a main portion secured by the stud means to the main casting in a position covering the drive sprocket and also having a rear flange extending toward the main casting and spaced rearwardly of the drive sprocket and the portion of the saw chain and a top flange extending toward the main casting and covering the upper portions of the drive sprocket and the portion of the chain thereon, the top flange of the cover having an L-shaped slot therein having a first portion extending parallel to the plane of the saw chain and a second portion extending generally transversely to said plane and also having a locking notch, the top flange also having a lug thereon provided with a tapped bore therethrough extending parallel to the first portion of the slot therein and spaced forwardly from the second portion of the slot, the main portion of the cover having a rear portion spaced outwardly from the plane of the chain and having at the lower portion thereof a boss having a bore extending perpendicularly to the plane of the saw chain, a guide rod mounted rigidly in the bore and extending inwardly from the boss, a generally vertical arm having on offset bearing portion at the lower end thereof mounted pivotally and slidably on the guide rod and also having an upper end portion extending through the slot in the top flange and provided with a rounded portion on the forward face thereof, the arm also having at the front thereof an arcuate dovetail portion having a stop shoulder at the lower end thereof, an arcuate shoe having an arcuate dovetail portion adapted to fit on the dovetail portion of the arm and provided with a tab at the lower end thereof adapted to engage the stop shoulder, screw means for clamping the shoe to the arm, an arcuate abrasive stone secured to the shoe and having a substantially uniform width and a substantially uniform thickness throughout the length thereof, the inner face of the arcuate abrasive stone having a radius greater than that of the path of the teeth and depth gauges of the portion of the saw chain on the drive sprocket when the stone and saw chain are new and being wearable by sharpening the saw chain to the same radius as that of the teeth and depth gauges, a spring secured to the lug of the arm and to the cover tending to swing the arm away from the saw chain and slide the arm along the rod until the rod is out of the projected area of the chain and into the locking notch, a handle having a centered, knob-like handle portion and quickly attachable to and detachable from the arm at a portion of the arm near the bearing portion thereof and extending from the outside of the cover to the inside thereof for swinging the arm toward the saw chain and for moving the arm back and forth relative to the saw chain, an adjustment screw threaded through the lug on the top flange, and a stop rotatable on the adjustment screw and held against movement along the adjustment screw and slidable along the top flange in a position extending across the second portion of the slot in the path of the rounded portion of the arm when the arm is swung toward the saw chain, the width of the portion of the arm extending through the second portion of the slot and the width of the second portion of the slot being such relative to each other and relative to the width of the stone and the width of the kerf that the stone is movable between a first extreme position in which one side of the stone is between the kerf edges of the chain and a second extreme position in which the other side of the stone is between the kerf edges of the chain.

7. In a chain saw, a saw chain having a plurality of projecting elements to be ground, means for guiding and advancing the saw chain along a predetermined path having an arcuate portion, the projecting elements having outer tips traveling along a path of a predetermined width as the tips travel around said arcuate portion of said predetermined path, a concavely arcuate sharpening member, means for moving the sharpening member into engagement with the tips as the tips travel around said arcuate portion of said predetermined path, means for moving the sharpening member back and forth across said path of the tips, stop means for limiting the movement of the sharpening member back and forth across said path to a throw of a predetermined distance, and means for adjusting the stop means to center the throw of the sharpening member relative to the path of the tips.

8. The combination of claim 1 wherein the carrier means is movable back and forth perpendicularly to the plane of the saw chain to dress the sharpening member, and stop means on the cover to limit the extremes of the back and forth movement of the sharpening member between a first extreme position in which one side edge of the sharpening member is inside the sides of the composite path of the teeth and a second extreme position in which the other side edge of the sharpening member is inside the sides of the composite path of the teeth.

9. A sharpening device for engaging a saw chain on an arcuate portion of a chain saw, a movable carrier means mounted on the chain saw, a sharpening element having an elongated, arcuate, concave sharpening surface and movable by the carrier means into and out of engagement with teeth of the saw chain, and a holder shoe means carrying the sharpening element and having a portion remote from said surface adapted to positively interlock with said carrier means to prevent movement of the sharpening element in the direction of travel of the saw chain when in engagement with the saw chain, the holder shoe means being quickly releasable from the carrier means, said holder means comprises a sheet metal shoe, the sheet metal shoe has a transverse tab adapted to engage the carrier means and positively engage the carrier means to hold the stone against movement with the chain.

10. The chain saw of claim 2 including means for limiting the movement of the sharpening member across the saw chain to a first extreme position in which one side edge of the sharpening member is completely inside the path of the saw chain and a second extreme position in which the other side edge of the sharpening member is completely inside the path of the saw chain.

11. The chain saw of claim 2 wherein the means mounting the sharpening member includes guide rod means mounted in a fixed position relative to the main frame and carrier means mounting the sharpening member on the guide and slidable along the guide rod means.

12. The chain saw of claim 11 wherein the carrier means is both slidable along the guide rod means and is pivotal on the guide rod means.

13. The chain saw of claim 11 wherein the carrier means is movable on the guide rod means perpendicularly of the plane of the saw chain for dressing movement of the sharpening member and also is movable on the guide means parallel to the plane of the saw chain to move the sharpening member into and out of engagement with the saw chain.

14. The chain saw of claim 13 wherein the carrier means is slidable in a straight line along the guide rod means for dressing movement of the sharpening member and is pivotal on the guide rod means for moving the sharpening member into and out of engagement with the saw chain.

15. In a chain saw, a chain-guiding means having an arcuate portion centered on a predetermined axis, a saw chain traveling around the chain-guiding means, the saw chain having a plurality of links having outwardly projecting elements having arcuate outer tip portions traveling in an arcuate path of a predetermined diameter around the arcuate portion, an elongated, narrow sharpening member having an arcuate sharpening surface of substantially the same radius as that of said arcuate path, the arcuate sharpening surface having a length sufficient and the tip portions being spaced sufficiently close together that the sharpening surface always engages at least two of the projections when the saw chain is advanced around the arcuate portion and the sharpening surface is pressed against the saw chain, the sharpening surface subtends an angle of at least 90°.

16. In a sharpener for use with a chain saw having an arcuate guide means and a saw chain advanced around the arcuate guide means, a sharpening member, means mounting the sharpening member for movement toward and into engagement with the portion of the saw chain being advanced around the arcuate guide means, and means for stopping movement of the sharpening member toward the saw chain to a position in which a predetermined sharpening cut on the saw chain has been made, the means mounting the sharpening member is movable perpendicularly to the plane of the saw chain to impart dressing movement to the sharpening member, the means for stopping movement of the sharpening member including wide stop means permitting such perpendicular movement of the means mounting the sharpening member.

References Cited
UNITED STATES PATENTS

| | | | |
|---|---|---|---|
| 1,742,070 | 12/1929 | Groves | 51—255 |
| 901,783 | 10/1908 | Coderre | 51—252 |

DONALD R. SCHRAN, Primary Examiner

U.S. Cl. X.R.

76—37